March 6, 1962

P. PATZ ETAL 3,023,917

SILO UNLOADER

Filed Dec. 27, 1960

INVENTORS.
P. Patz
E. A. Graetz
BY Lieber, Lieber & Nilles
Attorneys

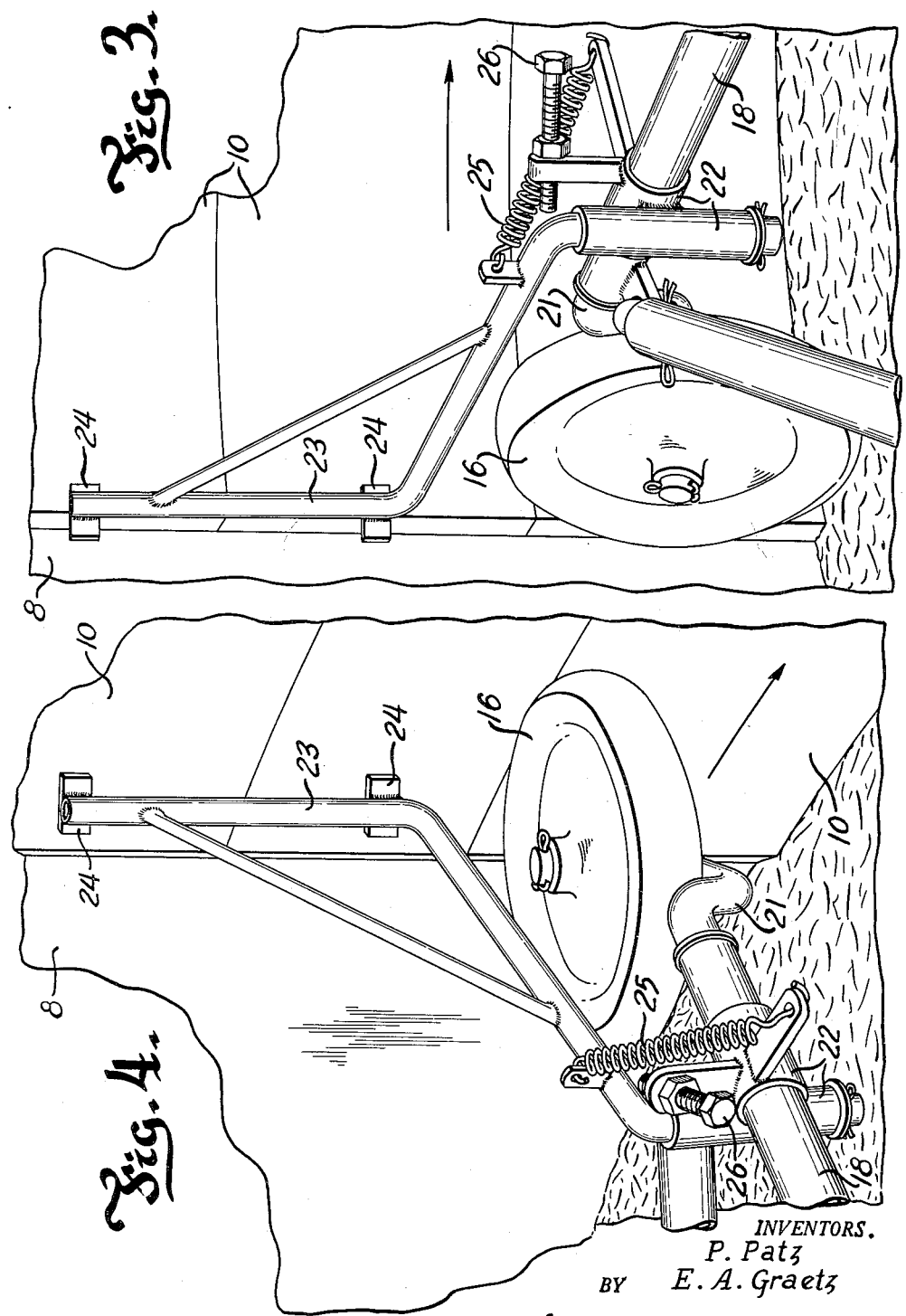

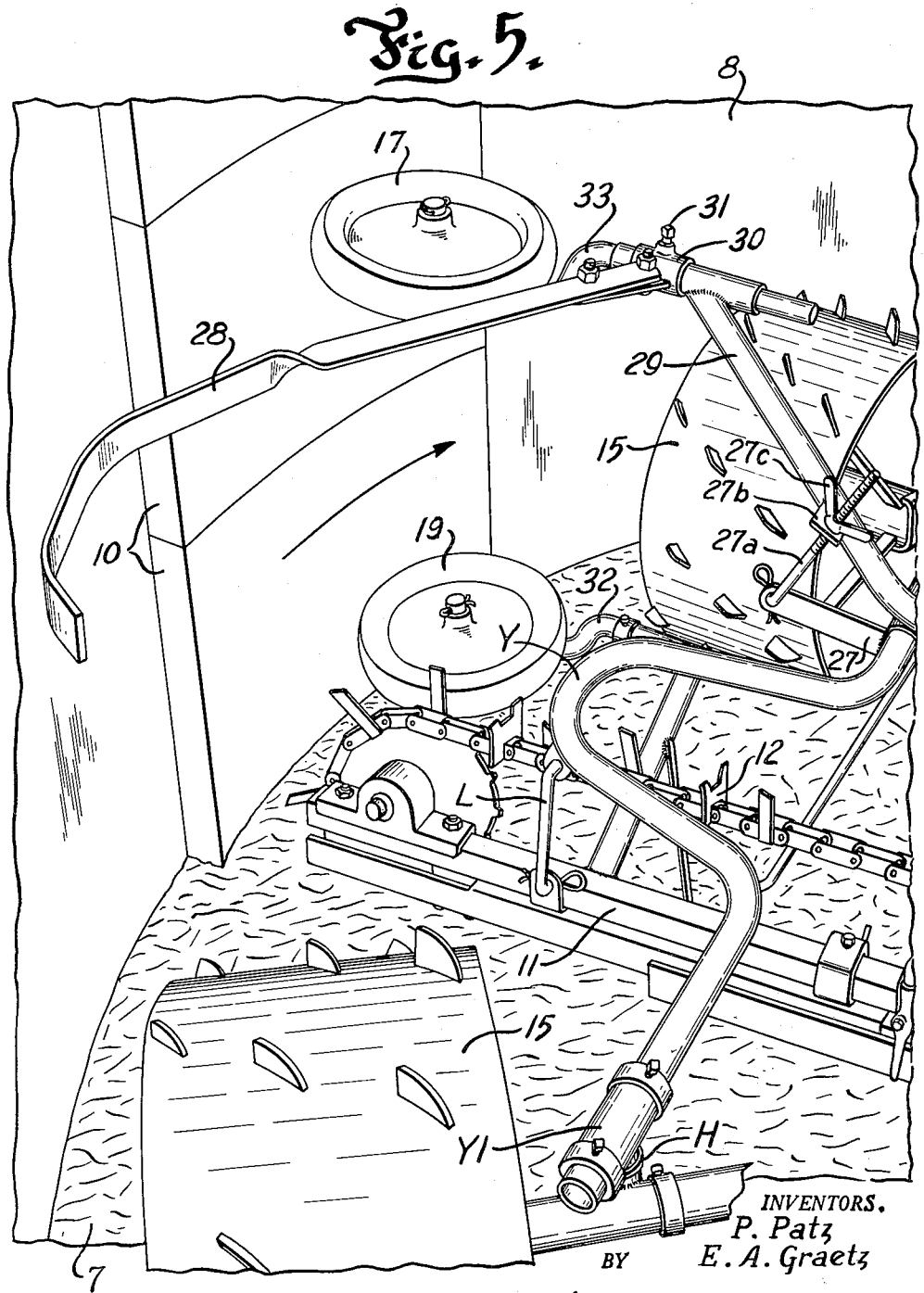

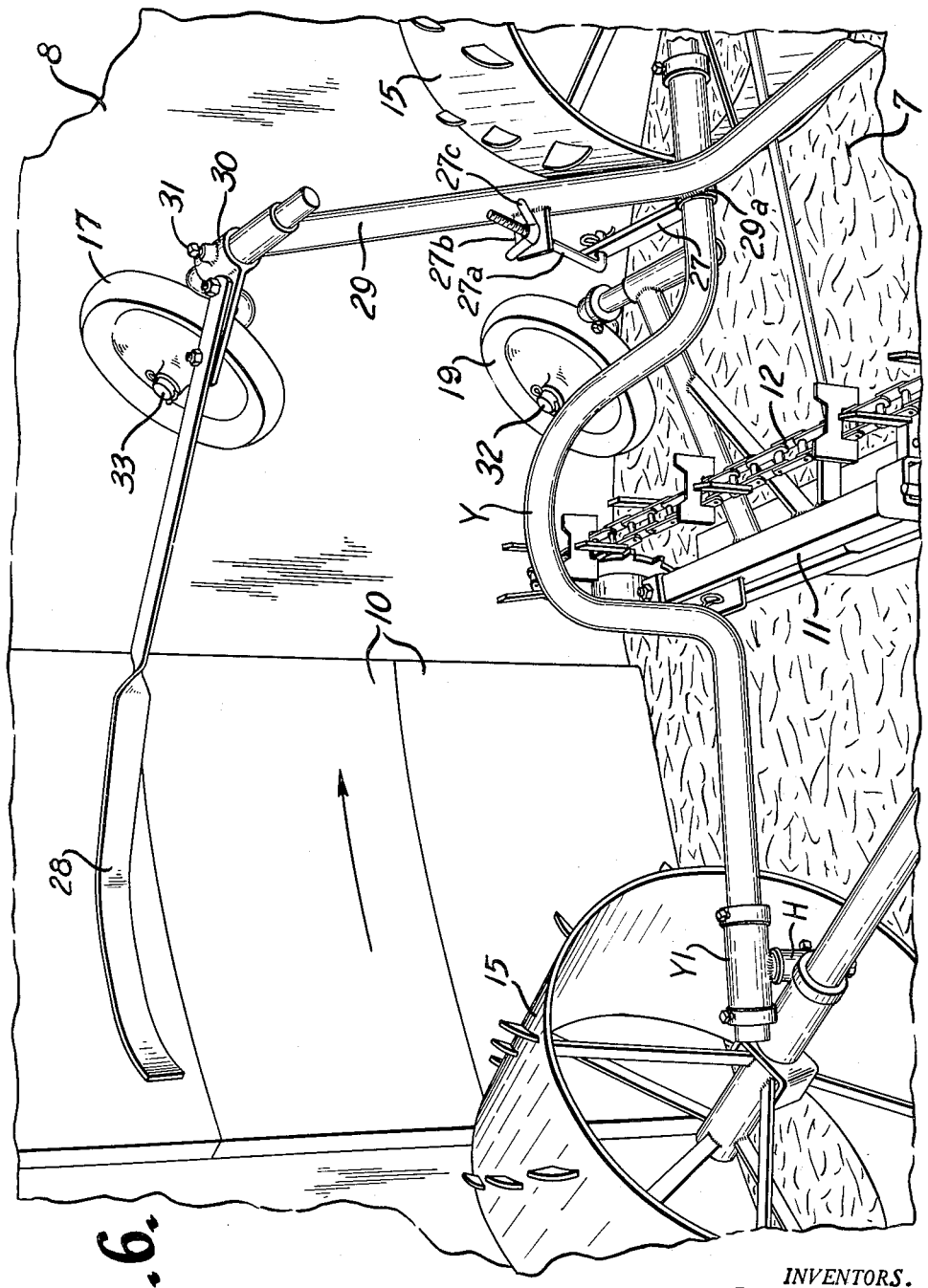

3,023,917
SILO UNLOADER
Paul Patz and Edward A. Graetz, Pound, Wis.
Filed Dec. 27, 1960, Ser. No. 78,407
11 Claims. (Cl. 214—17)

The present invention relates in general to improvements in mechanism for delivering bulk material such as ensilage from storage receptacles such as silos, and it relates more specifically to the construction and operation of apparatus for insuring proper cooperation of silo unloaders with silos having inset ensilage dispensing doors, and also relates to novel leveling and depth adjusting mechanism for the conveyor.

As disclosed in the copending application Serial No. 831,362, filed August 3, 1959, now Patent No. 3,013,674, it has heretofore been proposed to provide a successful silo unloader comprising an elongated rigid frame radiating from and revolving generally about the vertical axis of the silo and having thereon an endless chain conveyor for transporting ensilage inwardly from the top of the mass toward said axis and into a blower. The gathered material is then delivered by the blower through an opening in the circular silo wall. As the conveyor acts to scrape and move the material towards the center of the silo, the thrust of the traction wheels causes the conveyor to be revolved around the silo and also moved axially toward the silo wall. Therefore a thrust absorbing guide wheel is carried at the outer end of the conveyor frame to prevent the outer end of the conveyor from gouging or scraping the inner wall of the silo and this wheel also acts to roll around the inner wall to guide and permit the conveyor to swing around the silo. In order to maintain such a silo unloader properly disposed within the annular silo wall, another guide wheel is carried by a radial arm located a circumferential distance from the conveyor. Thus a pair of circumferentially spaced guide wheels are carried by the unloader and to maintain the inner end of the unloader centralized in the silo.

As furthermore shown in the said copending application, a leveling wheel is also utilized to maintain the conveyor in a level position. This is necessary because the conveyor otherwise digs unevenly in the material to create high and low spots and uneven feeding, resulting in malfunctioning of the unit. As the material is packed in the silo in varying degrees of firmness and as some of frozen along the outer wall and the inner material may not be, uneven scraping and conveyor action is a serious problem. This leveling wheel is positioned directly above the guide wheel carried at the outer end of the conveyor and is set so that it is in vertical alignment with the guide wheel as they ride along on the inner wall of the silo. When this guide wheel and the leveling wheel are thus in vertical alignment the setting of the conveyor is such that it is level.

When such an unloader is used in silos having inner walls containing inward projections, certain problems have arisen in maintaining the vertical alignment between the guide wheel and the leveling wheel. For example, in silos where inset doors are utilized, these doors provide an obstruction extending inwardly past the inner wall of the silo against which obstruction the guide wheels and depth wheels must travel. One of the difficulties has been due to the fact that after the guide wheel which is located adjacent the outer end of the conveyor leaves the inset door, it takes about two feet of forward travel before the action of the traction wheels is sufficient to again drive the guide wheel against the wall. It is during this interval of two feet of travel that the trouble occurs in maintaining the conveyor level, because the leveling wheel during this time drops against the silo wall and out of vertical alignment with the guide wheel located below it. As a result, during this interval of travel during which the traction wheels are again driving the guide wheel to the wall, the outer end of the conveyor drops below its predetermined level setting and causes gouging or low spots in the material.

It is accordingly one object of the invention to provide means for maintaining the thrust absorbing guide wheel and the leveling wheel in vertical alignment until the traction wheels have again pushed the thrust guide wheel against the wall of the silo and normal leveling action of the leveling wheel can again take place.

It is another object of the invention to provide a leveling device of the above type in which the depth of cut of the conveyor can be readily adjusted. This is accomplished by varying the vertical distance between the leveling wheel and the crank frame on which the outer end of the conveyor is suspended.

In this manner a novel leveling and depth adjusting mechanism is provided.

Another difficulty encountered in unloader devices in silos having inwardly extending projections, arises in connection with the circumferentially spaced guide wheel. This circumferentially spaced guide wheel travels ahead of the thrust absorbing guide wheel, in respect to the direction of rotation of the unit within the silo. A problem occurs when this forward guide wheel reaches the obstruction and causes a binding action between the unit and the obstruction. That is to say, the guide wheel has difficulty in climbing over the obstruction and the driving force of the traction wheels rearwardly of this guide wheel acts to cause a binding in the unit to the extent that rotation of the unit is prevented. Accordingly, another object of the invention is to provide a guide wheel "step" means carried adjacent this forward guide wheel, which means is effective upon reaching the obstruction to cause the entire unit to be shoved slightly off center, thus permitting the forward guide wheel to clear the obstruction and ride over it. As soon as this forward guide wheel passes the obstruction and before this guide wheel again moves against the silo wall, this shoving means quickly swings forwardly to its original position where it is ready for encountering the next obstruction on the silo wall. Generally then this object of the invention provides a simple but efficient means for enabling such silage unloaders to be applied to silos having either inset or external ensilage delivery doors, and to enable the forward guide wheel of the unloader to pass obstructions on the wall of the silo without stalling the machine.

Another important object of this invention is to provide devices for obviating the above-mentioned difficulties, which may readily be applied as accessories or attachments to standard silo unloaders adapted for normal use in silos which do not embody inset delivery doors or similar obstructions.

These and other objects of the invention will appear hereinafter as this disclosure progresses, reference being had to the following drawings in which:

FIGURE 3 is a further enlarged perspective view of the same centralizing guide wheel assemblage showing the caster guide wheel moved inwardly while approaching the insert door;

FIGURE 4 is a similarly enlarged perspective view of the centralizing guide wheel returned to normal horizontal guiding position in contact with the inset door and with the unit showing means in trailing position;

FIGURE 5 is an enlarged perspective view of the conveyor guide and level depth wheel assemblage, showing the thrust absorbing wheel and the leveling wheel in vertical alignment to prevent the conveyor from striking the silo wall and to avoid having the outer end of the conveyor chain drop so as to dig into the mass of ensilage;

FIGURE 6 is a similarly enlarged perspective view of the assemblage shown in FIGURE 5, but illustrating the manner in which the skid associated with the leveling wheel holds the leveling depth wheel and prevents it from dropping toward the silo wall until the thrust guide wheel located beneath it again engages the silo wall after passing an obstruction.

Although the improved attachments have been shown and described herein as being advantageously applicable to a silo unloader such as disclosed in the copending application hereinabove specifically referred to, it is not intended to limit their use to such unloaders; and it is also contemplated that specific descriptive terms employed herein be given the broadest possible interpretation consistent with the disclosure.

Figure 1:
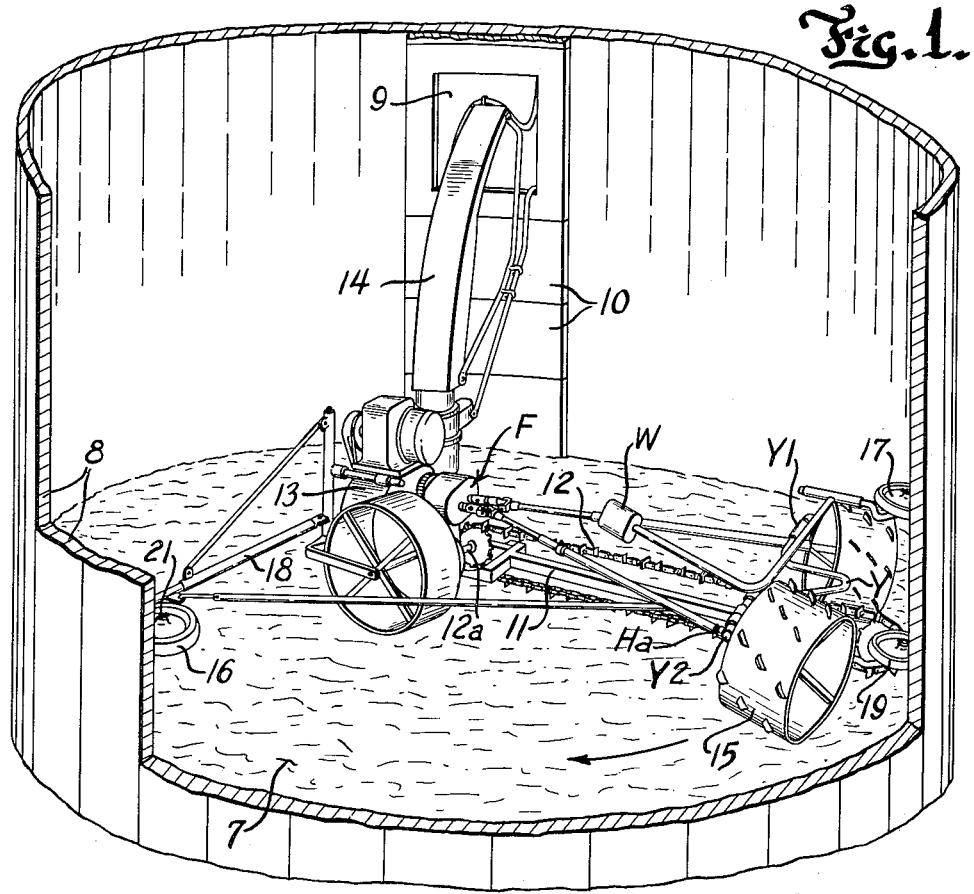
FIGURE 1 is a perspective view of one of the improved ensilage unloaders cooperating with the top of the mass of material confined within a fragment of an annular upright silo having inset delivery doors, the wall of the silo being broken away to more clearly reveal the unloader.

Referring to the drawing and especially FIGURE 1, the ensilage unloader shown therein is adapted to rest upon and to automatically gather and remove ensilage 7 from the top of a mass confined within an annular silo wall 8, and to deliver the gathered material through an opening 9 in this confining wall the lower portion of which is closed by several superimposed material retaining doors 10 which are successively removable as the ensilage mass is lowered. The ensilage unloader includes an elongated rigid conveyor frame 11 radiating from and revolvable about the vertical axis of the wall 8. This frame has thereon an endless chain conveyor 12 for gathering and transporting ensilage 7 from the top of the mass inwardly toward the silo axis from which the gathered material is delivered from the silo by a blower 13 through a conduit 14 directed through the opening 9. The conveyor frame 11 is revolved about the central silo axis by a traction frame F (FIGURE 1) which includes a pair of motor driven traction wheels 15, and is centralized relative to this axis by a thrust absorbing guide wheel 19, and a forward guide wheel 16 rotatably and pivotally mounted upon a radial arm 18 disposed approximately perpendicular to the frame 11. The thrust guide wheel 19 is mounted on the outer or swinging end of the conveyor frame 11 between the driving wheels 15. The conveyor frame is pivoted on the traction frame for swinging about the conveyor drive axis 12a (FIGURE 1). The traction wheels are connected together by a cross yoke Y which is oscillatable in its bearings Y1 and Y2 carried on the drive shaft housings H and Ha (FIGURES 1 and 6) of the traction frame. The outer end of the conveyor frame is pivotally connected to the yoke by a link L (FIGURE 5).

The guide wheels 16, 19 are normally engageable with and adapted to ride along the inner annular surface of the silo wall 8. A leveling wheel 17 is located directly above the thrust guide wheel 19 and is normally in vertical alignment with it to keep the conveyor level. This wheel 17 is rotatably mounted on the frame of the machine as will later appear, and also normally rides against the silo wall.

*Forward Guide Wheel Step Means*

Figure 2:
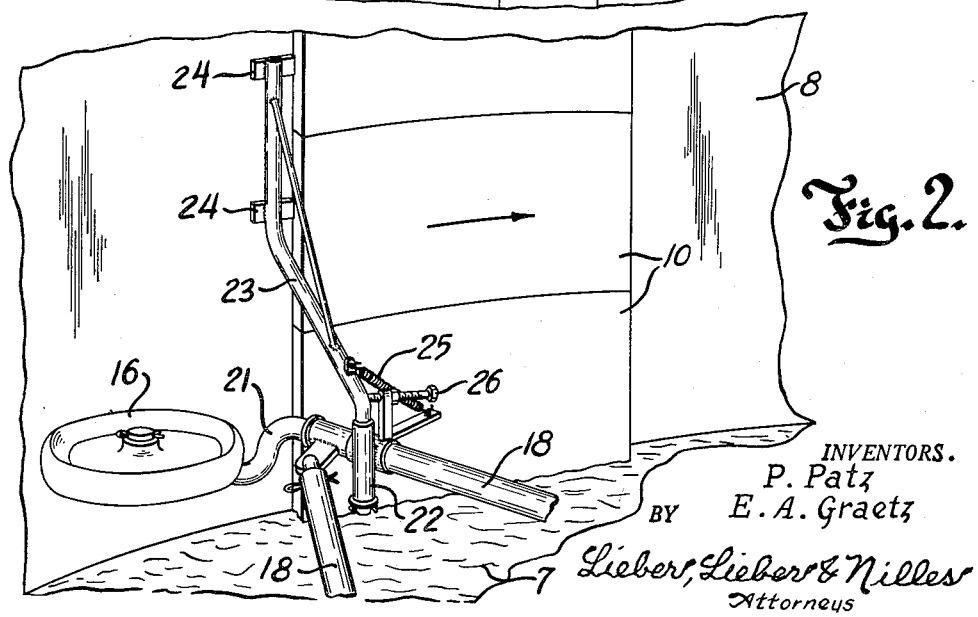
FIGURE 2 is an enlarged perspective view of the unloader centralizing guide wheel assemblage applied to a fragment of the silo and showing this forward guide wheel disposed horizontally and approaching an inset material delivery door.

When the silo is provided with inset doors 10 which project inwardly with respect to the inner annular wall surface, the forward guide wheel 16 normally rides along the inner surface of the wall 8 to maintain the unit centralized with respect to its axis of rotation. However, as the wheel 16 approaches the inset door 10 it is transferred gently upon the inner surface of this obstruction by a "unit shoving" or "step" means such as shown in FIGURES 2, 3 and 4. This wheel 16 in the improved assemblage is a caster wheel rotatably supported upon one end of a crank 21, the opposite end of which crank is pivotally confined within an opening in the swinging end of the radial arm 18, so that the wheel will travel horizontally when it rides along and in contact with either the inner wall surface as in FIGURE 2 or the inner surface of the adjacent door 10 as in FIGURE 4, but may drop temporarily into vertical position as in FIGURE 3 when removed from such surfaces.

Pivotally mounted within a fitting 22 secured to the radius arm 18, is a lever 23, the outer swinging end of which carries shoes 24 normally spaced slightly from the inner surface of the silo wall as the unloader revolves around the silo. This lever is also normally held with the shoes 24 in advance of the wheel 16 (FIGURE 2) by a helical tension spring 25 connecting the medial part of the lever 23 with a projection on the fitting 22. The spring 25 merely serves to return the lever 23 to a position in advance of the wheel 16 so as to prepare for the insert door edge the next time around. An adjustable stop screw 26 also mounted upon the fitting 22 arrests the swinging of the lever 23 forwardly of the wheel 16 to a proper position for clearing the silo wall and so that shoes 24 will properly engage the obstruction, such as doors 10. Thus, when the shoes 24 engage the obstruction such as the edge of an inset door 10, the lever 23 begins to swing rearwardly and thereby shoves the entire unloader unit, through arm 18, in a direction away from the obstruction. This provides clearance between wheel 16 and the wall, causing the wheel to drop as shown in FIGURE 3. This permits the wheel 16 to step easily onto the obstruction as rotation of the unit continues, as shown in FIGURE 4. As the wheel rolls along the door 10, the shoes simply trail behind. After the wheel 16 leaves the door 10 and before it has a chance to be urged against the silo wall again by the rotation of the unit, the spring 25 snaps the arm 23 forwardly to thereby place the shoes in position for the next obstruction.

*Leveling and Depth Adjusting Means*

While the thrust guide wheel 19 and the leveling wheel 17 are able to climb onto and pass over the inset doors 10 without difficulty or undesirably displacing the unit, it requires an interval of several feet of forward travel of these wheels before they again engage the inner surface of the silo wall 8.

It is during this interval of travel that uneven cutting of the conveyor occurs because the leveling depth wheel 17 then drops against the wall and allows the gathering chain 12 to drop deeper into the ensilage 7 thereby throwing the cut off level and tending to stall the unloader. In other words, the leveling wheel 17 reaches the wall before the guide wheel 19 is again thrust against the wall; wheels 17 and 19 no longer being in vertical alignment.

This detrimental action is effectively prevented by a skid 28 adjustably attached to the leveling wheel carrier arm 29 by means of a collar 30 and a set screw 31 as shown in FIGURE 6. The guide wheel 19 is rotatably supported to provide a swivel mounting, by means of a freely oscillatable crank shaft 32 while the depth leveling wheel 17 is likewise supported by an oscillatable crank shaft 33. These crank shaft mountings permit the wheels to move freely up and down the wall.

The arm 29 is mounted on yoke Y by its collar 29a and has a counterbalancing weight W secured to its opposite end. An adjustable connection is provided between arm 29 and the yoke Y and takes the form of an arm 27 welded to the yoke and which receives a link 27a in its apertured end. The other end of the link is threaded and extends through a bracket 27b welded to arm 29. A wing nut 27c engages the link and by turning it, the arm 29 can be oscillated relative to the yoke and thus the relative angular position between wheel 17 and the conveyor may be changed. In this manner the weight W counterbalances the end of the conveyor, and the depth of cut of the conveyor may be adjusted by turning nut 27c which adjusts the conveyor height through oscillation of yoke Y and the connecting link L, as will appear.

The yoke Y, arm 29, leveling wheel 17, and adjusting mechanism 27 to 27c constitute the leveling wheel assembly.

The function and operation of the leveling wheel will now be described in detail. When the wheel 17 is traveling around the silo wall in normal fashion, the skid 28 does not contact the wall. However, when the wheel has passed over the door 10 and begins to leave it, then the skid 28 has contacted the inner surface of the door and prevents the wheel 17 from falling against the wall upon running off of the door. In other words, the arm 29 and its associated yoke are prevented from rotating with and causing the conveyor to be lowered. After an interval of travel of the wheels 17 and 19 of about two feet past the inset doors, the thrust action of the traction wheels has by that time returned these wheels into contact with the silo wall. In this manner the wheels 17 and 19 are held in vertical alignment after they have left the doors 10 and until they are again urged together against the silo wall.

It has been found that if the wheel 17 is positioned against the walls at an inclined angle best results will be obtained. In other words, if the wheel 17 is raised slightly above a horizontal position, as shown in FIGURE 5, best holding and guiding action of the unit will occur.

In operation the wheel 17 is always held in vertical position relative to the wheel 19 and bears firmly against the silo wall in normal operation and then the wheel 17 is held in vertical alignment with wheel 19 by means of the skid 28 as the wheels leave the inset doors. This insures a level position of the conveyor at all times and prevents the outer end of the conveyor from gouging the material or digging in too deeply to an extent which would cause stalling of the machine.

General

It has been found that the wheels 17 and 19 have no difficulty in climbing onto the doors 10 as does the front guide wheel 16. This is perhaps due to the fact that a traction wheel is located adjacent the wheels 17 and 19 and serves to force these wheels easily over the doors. With the forward guide wheel 16 however, the traction wheels located rearwardly thereof tend to create a binding or wedging action between the guide wheel and the doors as they attempt to force this front guide wheel over the doors. Therefore the step means in the form of the shoes 24 which serves to shove the unit bodily to permit the wheel 16 to climb onto the doors, has proved very satisfactory to overcome this difficulty.

Both the side guide wheel withdrawing device and the conveyor guide and leveling wheel mechanism, may be readily applied as accessories to standard silo unloaders which previously did not require the same; and the accessories when properly applied and adjusted to cooperate with silos having inset doors 10 of definite thickness perform their intended functions effectively and automatically.

Various modes of carrying out the invention are contemplated as being with the scope of the following claims particularly pointing out and distinctly claiming the subject matter which is regarded as the invention.

We claim:

1. A silo unloader comprising, a frame radiating from and being revolvable generally about the central axis of a silo having an upright annular wall provided with a side opening and an inset door closing a lower portion of the opening, a conveyor suspended from said frame and being operable to gather and transport ensilage inwardly from the silo wall toward said axis during revolution of the frame, means for delivering the gathered ensilage away from said axis through said opening, a guide wheel assembly carried by said frame and circumferentially remote from said conveyor and having a wheel normally engageable with said wall to prevent off-setting of the unloader relative to said axis, and a device carried by said assembly and forwardly of said guide wheel for contacting said door and shoving said wheel from said wall whereby said wheel can easily climb onto said door and pass thereover.

2. A silo unloader comprising, a frame radiating from and being revolvable generally about the central axis of a silo having an upright annular wall provided with a side opening and an inset door closing a lower portion of the opening, a conveyor suspended from said frame and being operable to gather and transport ensilage inwardly from the silo wall toward said axis during revolution of the frame, means for delivering the gathered ensilage away from said axis through said opening, an arm radiating from the inner end of and revolvable with said frame, a guide wheel carried by the outer end of said arm and being engageable with said wall to normally maintain the frame generally centralized relative to said axis, and a swingable lever mounted on said arm and forwardly of said wheel and being operable to contact said door and retract said wheel and arm from said wall to cause it to travel without shock past the inset door.

3. A silo unloader comprising, a frame radiating from and being revolvable generally about the central axis of a silo having an upright annular wall provided with a side opening and an inset door closing a lower portion of the opening, a conveyor suspended from said frame and being operable to gather and transport ensilage inwardly from the silo wall toward said axis during revolution of the frame, means for delivering the gathered ensilage away from said axis through said opening, a guide wheel carried by said frame circumferentially remote from said conveyor and being engageable with said wall to normally maintain the inner end of said frame generally centralized with respect to said axis, and a shiftable lever carried on said frame and forwardly of said wheel and engageable with said inset door to transfer the wheel onto the inner door surface whenever the lever contacts said inset door and is actuated thereby.

4. A silo unloader comprising, an elongated conveyor radiating from and being revolvable about the central axis of a silo having an annular upstanding wall provided with a side opening and an inset door closing a lower portion of the opening, means for operating said conveyor to gather and transport ensilage inwardly toward said axis and for delivering the gathered material away from the axis through said opening, a side guide wheel circumferentially spaced from and being revolvable with said conveyor and engageable with said silo wall to generally centralize the inner end of said revolving conveyor relative to said axis, and a lever shiftably mounted on said unloader and forwardly of said wheel and engageable with said inset door and acting to shove said unloader bodily away from said door as said unloader rotates past said door, whereby said guide wheel can clear said door and roll thereover.

5. A silo unloader comprising, an elongated conveyor radiating from and being revolvable generally about the central axis of a silo having an annular upstanding wall provided with a side opening, means for operating said conveyor to gather and transport ensilage inwardly toward said axis and for delivering the gathered material away from the axis through said opening, a leveling wheel rotatable on said silo wall and connected with the revolving end of said conveyor to maintain the revolving conveyor in level ensilage gathering position, and means adapted to bear against said door as said means passes thereover and connected with said leveling wheel to prevent said conveyor from assuming off level condition when the leveling wheel moves past the inset door and in a position away from said wall.

6. A silo unloader comprising, an elongated conveyor radiating from and being revolvable generally about the central axis of a silo having an annular upstanding wall provided with a side opening and an inset door closing a lower portion of the opening, means for operating said conveyor to gather and transport ensilage inwardly toward said axis and for delivering the gathered material away from the axis through said opening, a leveling wheel cooperating with the revolving end of said conveyor and with said silo wall to maintain the revolving conveyor in level ensilage gathering position, said wheel also riding over said door as it moves past the door, and a skid connected with said wheel and located circumferentially rearward thereof, said skid adapted to bear against said door as it moves thereover and thereby prevent said wheel from shifting to a conveyor unlevel position when said wheel moves off said door and has not yet returned to contact with said wall.

7. A silo unloader comprising, an elongated conveyor radiating from and being revolvable generally about the central axis of a silo having an annular upstanding wall provided with a side opening and an inset door closing a lower portion of the opening, means for operating said conveyor to gather and transport ensilage inwardly from the revolving end of the conveyor and toward said axis and for delivering the gathered material away from the axis through said opening, a leveling wheel and a cooperating guide wheel mounted adjacent and revolvable with the revolving end of said conveyor whereby both of said wheels rotate against the silo wall and the door to maintain the conveyor in a level position, and means having a connection with said leveling wheel and mounted circumferentially rearwardly of said leveling wheel and adapted to bear against said door to support said leveling wheel in a conveyor level position when said leveling wheel leaves said door and is not yet returned to said wall.

8. A silo unloader comprising, a traction frame for revolving said unloader generally about the central axis of a silo having an annular upstanding wall provided with a side opening and an inset door closing a lower portion of the opening, a conveyor frame pivotally mounted at one end to said traction frame and having a free end, a conveyor mounted on said conveyor frame, means for operating said conveyor to gather and transport ensilage inwardly from said free end and toward said axis and for delivering the gathered material away from the axis through said opening, a guide wheel mounted on and revolvable with said free end of said conveyor frame, a leveling wheel assembly swingably mounted on said traction frame and having a connection with said conveyor frame for swinging therewith, said assembly including a leveling wheel normally positioned directly above and in vertical alignment with said guide wheel whereby both of said wheels rotate against the silo wall and the door ot maintain the conveyor in a level position, and means having a connection with said leveling wheel and mounted circumferentially rearwardly of said leveling wheel and adapted to bear against said door to support said leveling wheel in a conveyor level position when said leveling wheel leaves said door and is not yet returned to said wall.

9. An unloader as defined in claim 8 including means for adjusting the conveyor frame relative to said leveling wheel.

10. A silo unloader comprising, an elongated conveyor radiating from and being revolvable generally about the central axis of a silo having an annular upstanding wall provided with a side opening and an inset door closing a lower portion of the opening, means for operating said conveyor to gather and transport ensilage inwardly from the revolving end of the conveyor and toward said axis and for delivering the gathered material away from the axis through said opening, a leveling wheel and a cooperating guide wheel mounted adjacent and revolvable with the revolving end of said conveyor whereby both of said wheels rotate against the silo wall and the door to maintain the conveyor in a level position, means having a connection with said leveling wheel and mounted circumferentially rearwardly of said leveling wheel and adapted to bear against said door to support said leveling wheel in a conveyor level position when said leveling wheel leaves said door and is not yet returned to said wall, and a side guide wheel assembly carried by said unloader and circumferentially remote from said conveyor and having a side guide wheel normally engageable with said wall to prevent offsetting of the unloader relative to said axis, and a device carried by said assembly and forwardly of said side guide wheel for contacting said door and shoving said side guide wheel from said wall whereby said side guide wheel can easily climb onto said door and pass thereover.

11. A silo unloader comprising, a traction frame for revolving said unloader generally about the central axis of a silo having an annular upstanding wall provided with a side opening and an inset door closing a lower portion of the opening, a conveyor frame pivotally mounted at one end to said traction frame and having a free end, a conveyor mounted on said conveyor frame, means for operating said conveyor to gather and transport ensilage inwardly from said free end, and toward said axis and for delivering the gathered material away from the axis through said opening, a guide wheel mounted on and revolvable with said free end of said conveyor frame; a leveling wheel assembly swingably mounted on said traction frame and connected with said conveyor frame for swinging therewith, said assembly including a leveling wheel normally positioned directly above and in vertical alignment with said guide wheel whereby both of said wheels rotate against the silo wall and the door to maintain the conveyor in a level position, and means having a connection with said leveling wheel and mounted circumferentially rearwardly of said leveling wheel and adapted to bear against said door to support said leveling wheel in a conveyor level position when said leveling wheel leaves said door; and a side guide wheel assembly secured to said traction frame and circumferentially remote from said conveyor and having a side guide wheel normally engageable with said wall to prevent offsetting of the unloader relative to said axis, and a device carried by said side guide wheel assembly and forwardly of said side guide wheel for contacting said door and shoving said side guide wheel from said wall whereby said guide wheel can easily climb onto said door and pass thereover.

References Cited in the file of this patent
UNITED STATES PATENTS
2,801,885    Harris _____ Aug. 6, 1957